Sheet 1 – 2 Sheets
J. Stevens.
Shirt Bosom Folder.
No 2097 Reissued Oct. 24, 1865
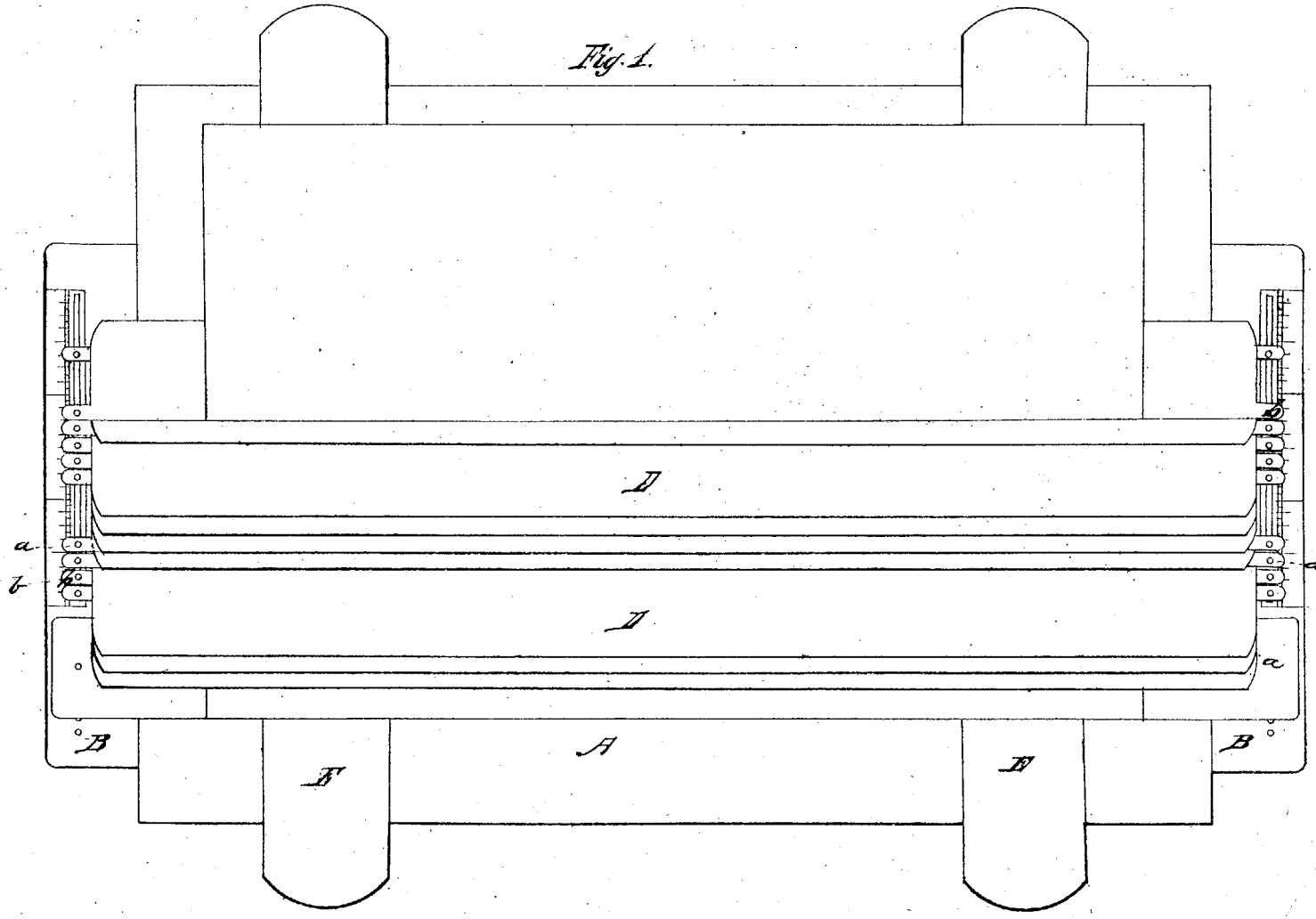

Sheet 2 2 Sheets
J. Stevens.
Shirt Bosom Folder.
No. 2097 Reissued Oct. 24, 1865
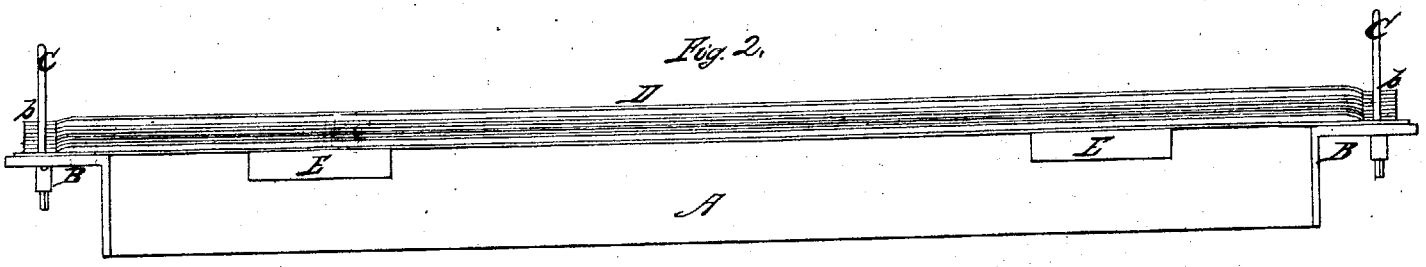
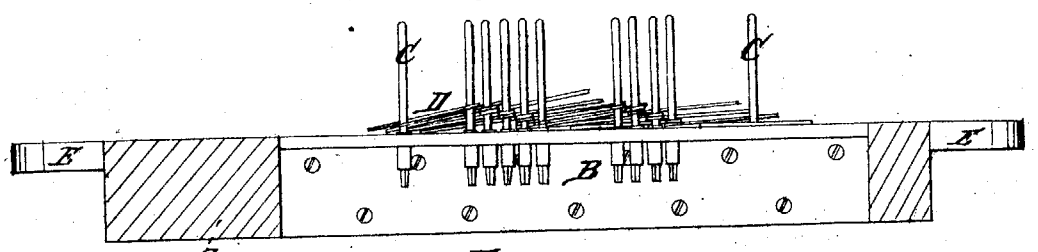
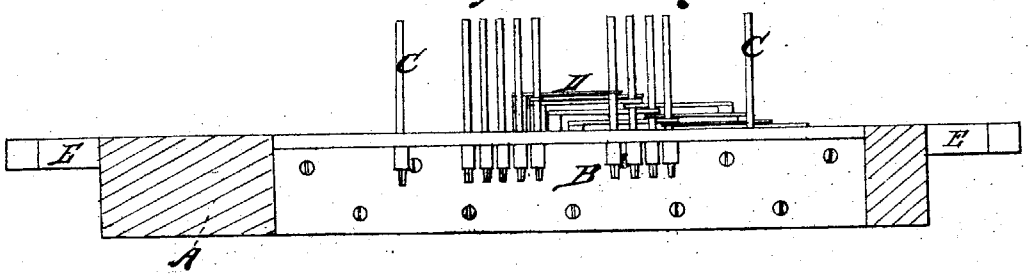

UNITED STATES PATENT OFFICE.

JOHN STEVENS, OF NEW YORK, N. Y.

IMPROVEMENT IN SHIRT-BOSOM FOLDERS.

Specification forming part of Letters Patent No. 22,039, dated November 9, 1858; Reissue No. 2,097, dated October 24, 1865.

*To all whom it may concern:*

Be it known that I, JOHN STEVENS, of the city, county, and State of New York, have invented a new and useful Improvement in Shirt-Bosom Folders; and I do hereby declare that the following is a full, clear, and exact description thereof, which will enable those skilled in the art to make and use the same, reference being had to the accompanying drawings, forming part of this specification, in which—

Figure 1 is a plan showing the linen folded between the tins; Fig. 2, a front elevation; Fig. 3, a side elevation, and Fig. 4 a side elevation showing the tins with a flange on one edge by which they are made to be parallel.

This invention consists in the employment or use of a series of strips of metal, herein termed "tins," but which may be made of steel or any suitable metal or material, and of equal lengths, arranged with an adjusting mechanism in such a manner that the tins may be adjusted to vary the width of the plaits of the bosom as may be desired. The tins for forming the plaits have been previously used, but so far as I am aware, no means have been devised to admit of their adjustment in order to vary the width of the plaits. This feature, which is an important one, constitutes the gist of the invention.

A is a bed-plate, which may be made of wood. Secured to each end of the bed-plate, and of nearly the same length, are two angle-irons, B B, having a slot running lengthwise of the angle-irons, made to correspond with the T of the pins. C are pins having a square head forming a shoulder near the bottom, with a screw thread and nut beneath by which the pins are securely held in place.

D are strips of metal about an inch wide and nearly the length of the bed plate, the ends of which are cut away, so as to have an ear, *b*, on each end, having an eye, *a*, the pins passing through which hold the tins D in place.

Tins, as stated in the preamble, have been used before in bosom-folders, but the great difficulty has been in making small plaits. The tins being made the width of the plaits made them so slender that they were liable to spring, thereby leaving the plaits crooked, which in this device is avoided, as the small plaits are made with the same size tins as the large ones. The surfaces of the angle-irons are graduated so that the plaits can be easily measured by moving the pins in the slot; also, when the linen is a little short, the plaits can be made narrower, to accommodate the linen. E E are two lifters rabetted into the bed-plate near the ends, and made a little longer than the width of the bed-plate. These lifters are for the purpose of raising the tins off the pins after the bosom has been folded. In folding I use six thicknesses of linen at once. In order to have the tins lie level, as in Fig. 4, I make a flange on the opposite edge of the tin to where the ears are, on half of the number of tins the thickness of one tin, on the other half or remainder, the tins being numbered. The first one has a flange the thickness of one tin, the second of two tins, the third three, and so on.

The operation is as follows: Place the linen on the bed-bottom and lay the first tin on it, allowing the linen to overlap the tin enough to allow for stretching. The next tin is then put on and the linen turned over the edge the nearest to where the tin is slipped over the pin.

For all of the narrow plaits two tins on each pin are required in opposite directions, and for the wide plaits only one tin. I get the narrow plait with the wide tin by turning the tins. The tins are laid on one at a time, and the linen turned over until all are on. Then the tins are taken from the pins by raising the lifters up. The tins being then drawn out, the bosom is ready for stitching and the machine ready for use.

I do not confine myself to the means herein shown and described for adjusting the tins or metal strips, as that may be varied or modified in various ways.

I do not claim, broadly, the employment or use of tins or metal for folding or forming plaits for shirt-bosoms, for they have been previously used, but I do claim as new and desire to secure by Letters Patent—

The tins or metal strips aforesaid when arranged with an adjusting mechanism to admit of wide and narrow plaits, or plaits varying in width, being formed with one and the same set of tins or strips, substantially as described, for the purpose specified.

JOHN STEVENS.

Witnesses:
M. M. LIVINGSTON,
E. L. TOPLIFF.